May 2, 1933.  C. F. PETERSON  1,907,303

COMPOSITE MOLDED ARTICLE

Filed Feb. 26, 1930

Inventor:
Charles F. Peterson,
by Charles E. Mullen
His Attorney.

Patented May 2, 1933

1,907,303

UNITED STATES PATENT OFFICE

CHARLES F. PETERSON, OF SCOTIA, NEW YORK, ASSIGNOR TO GENERAL ELECTRIC COMPANY, A CORPORATION OF NEW YORK

COMPOSITE MOLDED ARTICLE

Application filed February 26, 1930. Serial No. 431,607.

The present invention relates to molded articles comprising hardened plastic compositions and containing inserts of unlike material, such as metal, having unlike contractibility. My invention includes both a new product and a new method.

One of the serious difficulties in molding plastic materials, such for example as phenol-formaldehyde resins, with metal inserts is the tendency of the resin or resin composition to crack around the inserts due to the fact that the shrinkage of the resin or resin composition is different from that of the metal inserts. In cases where the metal inserts are of comparatively large size, this cracking is so frequent and aggravated that it has heretofore been found impossible to mold certain sizes of metal inserts in the resin or resin compound. To illustrate the degree of shrinkage which may be present when molding metal inserts in synthetic resins, it is found, for example, that when a certain phenol-formaldehyde resin compound is molded with metal inserts the contraction from the molding temperature, which is about 160 to 170° C., to room temperature of the molding compound is approximately 8 mils per inch, while that of the metal inserts used is approximately 1.5 mils per inch. It will thus be apparent that the shrinkage stresses which occur when a molded article containing the metal inserts cools are such as will crack the resin around the inserts and spoil the article or render it unfit for use. In particular, where certain articles such as molded insulation shells for electrical apparatus, for example, contact chambers in devices like fluid break switches, are molded from resins and which contain several metal inserts, it will be obvious that it is important that they be free from cracks.

I have discovered that the difficulties above described in molding metal inserts in plastic compositions can be overcome by wrapping the metal insert on the surfaces which come in contact with the resin with a plurality of relatively thin layers of a material which is compressible and preferably flexible. Cotton yarn, such as used in making cotton covered magnet wire, is an example of such material.

Figure 1:
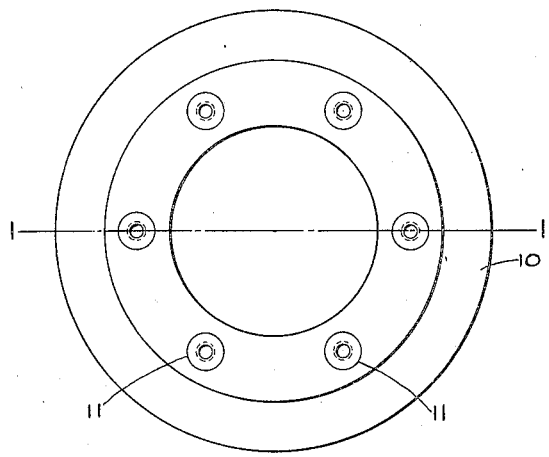
Figure 2:
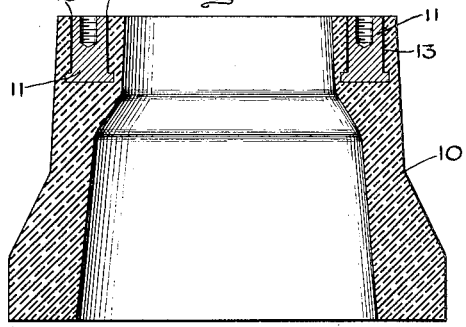
Figure 3:
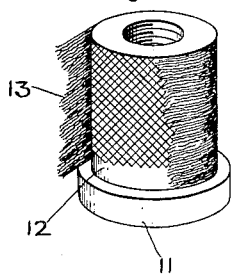
Figure 4:
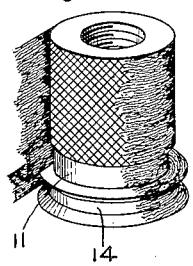

In order that my invention may be more fully understood and practiced by those skilled in the art to which it pertains I shall describe it more in detail, reference being had to the accompanying drawing forming part of this application and in which Fig. 1 is a plan view of an example of a synthetic resin article containing metal inserts and molded according to the present invention: Fig. 2 is a sectional elevational view taken along the line 1—1, Fig. 1; Fig. 3 is a view in elevation of the metal insert shown in the article illustrated in Figs. 1 and 2 and showing how the flexible material is wrapped around the surfaces thereof which come in contact with the resin; and Fig. 4 is a view similar to Fig. 3 illustrating another form of metal insert in the process of being wrapped with the flexible material.

The basic idea underlying this invention is that the material wrapped around the metal insert acts as a cushion permitting the resin compound to shrink around the metal insert. In other words, on account of its comparative compressibility the layer of wrapping material relieves the stresses which would otherwise cause the resin to crack around the metal inserts. In addition, the flexible and compressible material, such as textile fibres, being also relatively porous, permits the resin to partly enter and to a degree fill the pores thereof.

Figs. 1 and 2 illustrate by way of example an insulation shell 10 formed of a plastic composition comprising inert filler and phenol-formaldehyde resin and in which must be embedded several metal inserts 11. A type of insert which may conveniently be used is shown in detail in Fig. 3. Prior to the molding of the shell the outer surface 12, which is knurled, is provided with a plurality of relatively thin layers of the flexible, compressible, porous material, such as cotton yarn, 13, wrapped around as shown. After being so provided with the cotton wrapping the insert is placed in the usual mold which is then provided with a charge of the molding powder and molded in a manner well known in the art. In some cases, the collar portion 14 may be cut away forming a retaining flange as shown in Fig. 4 which anchors the wrappings and prevents their displacement by the contracting force of the resin compound.

It has been found that by the use of the process above outlined metal inserts may be successfully molded with synthetic resins or resin compositions which have a materially different rate of contraction from that of the metal inserts. Metal inserts molded as above described are firmly embedded in the resin and are only separated therefrom with the greatest difficulty.

While I have specifically described the process of my invention using cotton yarn as the cushioning material it is to be understood that my invention is not limited to the use of this material. Other materials, such as cotton tape, silk tape, woolen tape, India rubber, and in fact any compressible material which is preferably also flexible and which can be wrapped around the metal inserts in the form of relatively thin layers may be used in carrying out the process of my invention.

What I claim as new and desire to secure by Letters Patent of the United States, is,—

A contact chamber for fluid break switches comprising a hardened plastic composition having rigid metal anchoring inserts substantially totally embedded therein, said inserts being closely surrounded by a relatively thin layer of textile fibers wrapped on substantially the entire surface thereof coming into contact with the composition, said inserts being permanently set into said chamber.

In witness whereof, I have hereunto set my hand this 25th day of February, 1930.

CHARLES F. PETERSON.